(12) United States Patent
Bohn et al.

(10) Patent No.: US 6,635,139 B2
(45) Date of Patent: Oct. 21, 2003

(54) METHODS OF MAKING THERMAL SEALS AND PERFORATIONS

(75) Inventors: Michael L. Bohn, Rochester, NY (US); William P. Belias, Pittsford, NY (US)

(73) Assignee: Pactiv Corporation, Lake Forest, IL (US)

(*) Notice: Subject to any disclaimer, the term of this patent is extended or adjusted under 35 U.S.C. 154(b) by 121 days.

(21) Appl. No.: 09/880,452

(22) Filed: Jun. 13, 2001

(65) Prior Publication Data

US 2002/0189751 A1 Dec. 19, 2002

(51) Int. Cl.[7] .......................... B32B 31/18; B32B 31/20
(52) U.S. Cl. ................. 156/251; 156/252; 156/253; 156/275.1; 156/290; 493/203; 493/208; 493/267
(58) Field of Search ................. 156/251, 252, 156/253, 515, 530, 582, 583.1, 583.5, 290, 275.1; 53/451; 493/189, 190, 193, 205, 208, 267, 194, 199, 203

(56) References Cited

U.S. PATENT DOCUMENTS

| | | | |
|---|---|---|---|
| 2,248,471 A | 7/1941 | Stroop | |
| 2,420,983 A | 5/1947 | Salfisberg | |
| 3,300,365 A | 1/1967 | Roos | |
| 3,933,563 A | * | 1/1976 | Carlisle .................. 156/251 |
| 4,017,351 A | * | 4/1977 | Larson et al. ............. 156/494 |
| 4,567,984 A | | 2/1986 | Gietman, Jr. ............. 206/390 |
| 4,642,084 A | | 2/1987 | Gietman, Jr. ............. 493/190 |
| 4,867,735 A | * | 9/1989 | Wogelius ................ 493/197 |
| 4,889,522 A | | 12/1989 | Gietman, Jr. ............. 493/193 |
| 5,209,800 A | | 5/1993 | Spencer et al. |
| 5,308,666 A | * | 5/1994 | Borchardt ............... 428/35.2 |
| 5,417,035 A | | 5/1995 | English |
| 5,611,627 A | | 3/1997 | Belias et al. ............. 383/37 |
| 5,683,340 A | | 11/1997 | Belias et al. ............. 493/195 |
| 5,967,663 A | | 10/1999 | Vaquero et al. ........... 383/35 |
| 6,059,458 A | | 5/2000 | Belias et al. ............. 383/75 |
| 6,059,707 A | | 5/2000 | Belias et al. ............. 493/198 |
| 6,089,753 A | | 7/2000 | Belias et al. ............. 383/3 |

OTHER PUBLICATIONS

International Search Report for International Application No. PCT/US02/16109; dated Sep. 18, 2002 (4 pages).

* cited by examiner

*Primary Examiner*—Curtis Mayes
*Assistant Examiner*—Cheryl N. Hawkins
(74) *Attorney, Agent, or Firm*—Jenkens & Gilchrist

(57) ABSTRACT

A method for simultaneously sealing and creating a thermal perforation between two thermoplastic layers that comprises providing two thermoplastic layers. A drum is provided that has at least one sealbar and perforation assembly. The two thermoplastic layers are contacted to the sealbar and perforation assembly. The thermoplastic layers are sealed with two generally opposing parallel seals and simultaneously create a thermal perforation in the thermoplastic layers generally parallel to the opposing seals. The thermal perforation is located between the two opposing seals.

21 Claims, 3 Drawing Sheets

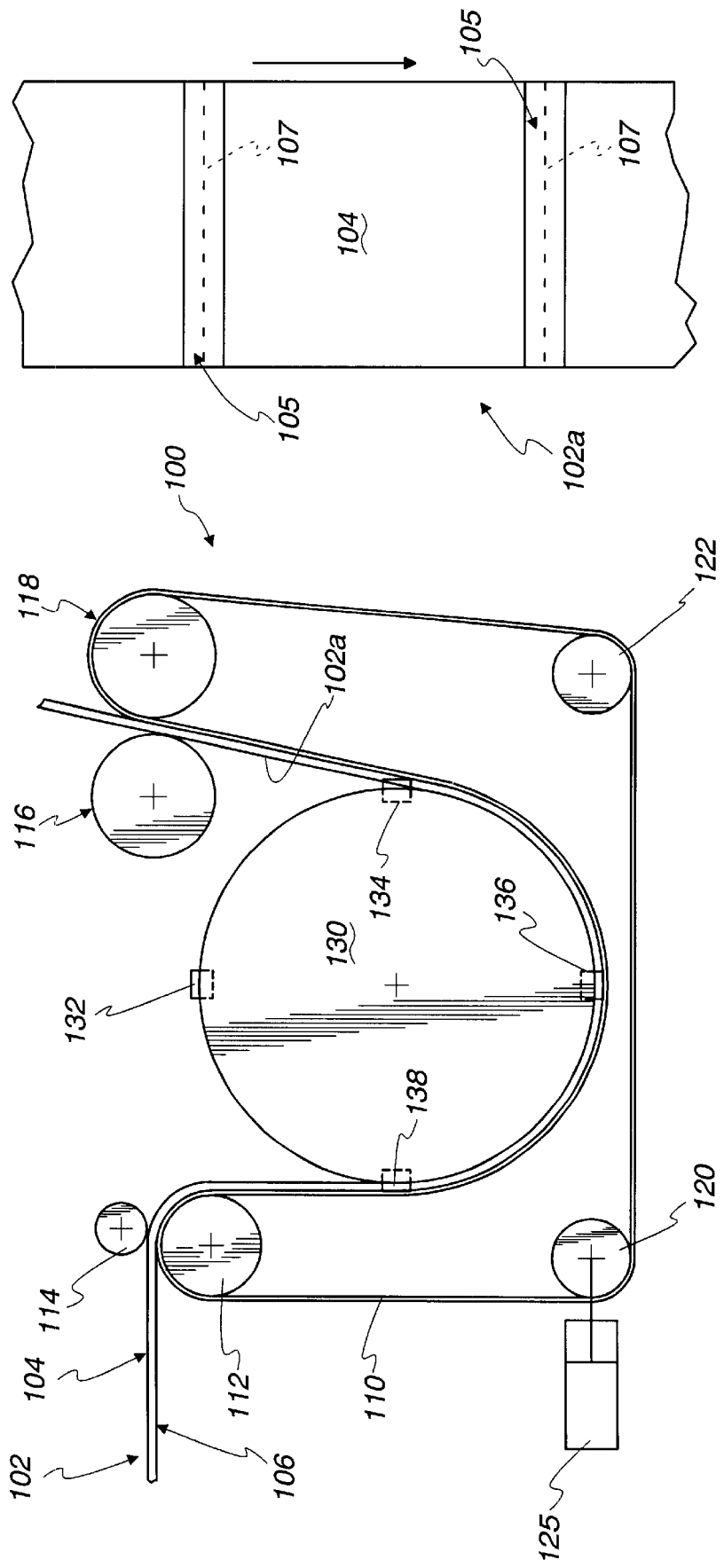

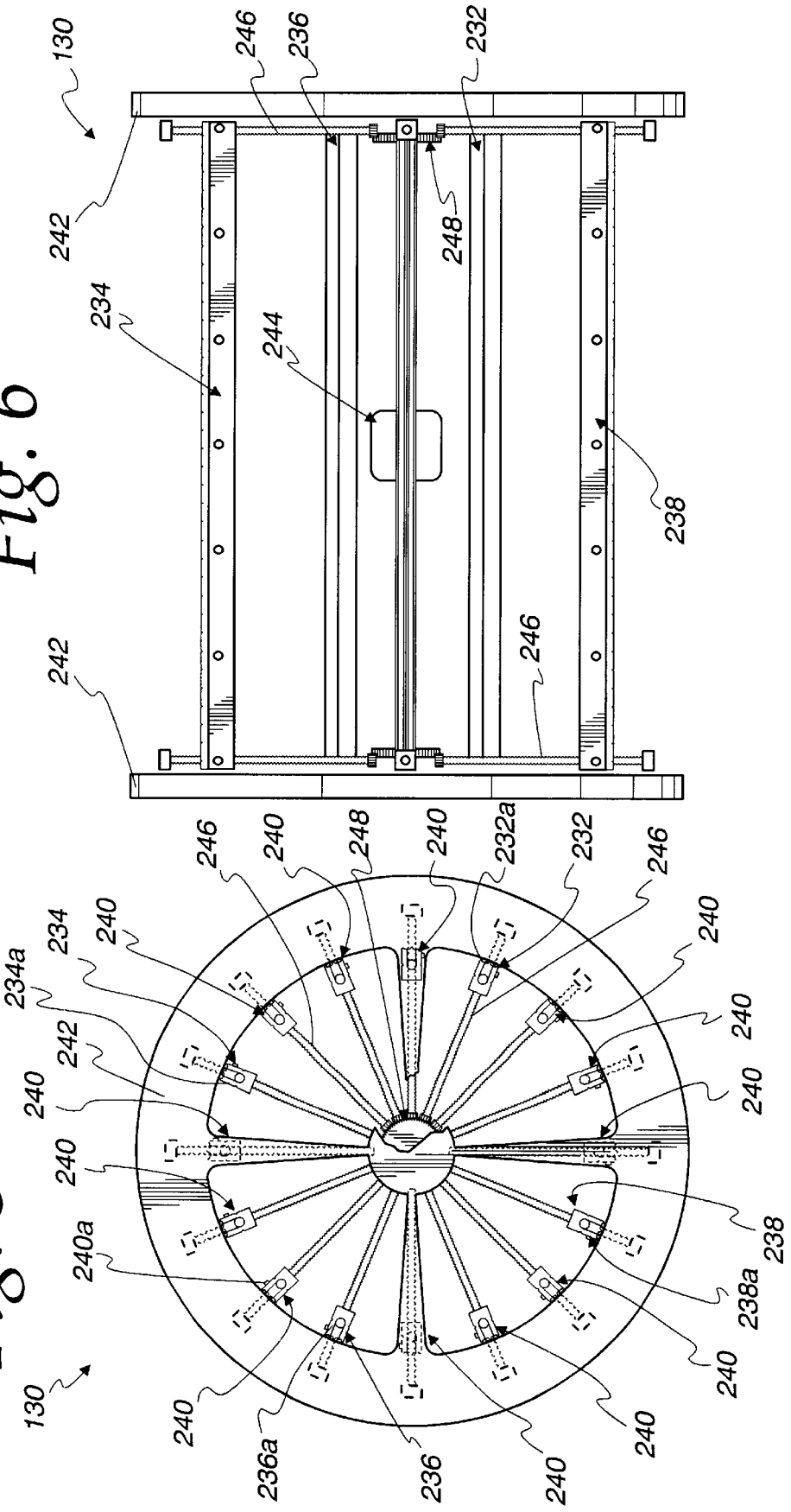

METHODS OF MAKING THERMAL SEALS AND PERFORATIONS

FIELD OF THE INVENTION

The present invention relates generally to method of sealing two or more layers of thermoplastic film and, more specifically, to a method of making thermal seals and perforations for thermoplastic films and bags.

BACKGROUND OF THE INVENTION

For many years, thermoplastic bags have been widely used for a number of household and industrial purposes. Many bags have a rectangular structure comprising two layers of a c-folded thermoplastic film heat sealed along its sides with an open top. The c-folded thermoplastic web layers are integrally connected at the bottom. This c-folded structure has been adapted to form a variety of sizes and configurations that depend on the intended uses of bags. The bags are often formed from a web of film that is separated by bag widths via perforations. In recent years, bag manufacturers have developed new types of thermoplastic bags such as, for example, draw tape bags, handle bags and bags with protruding top edges that are more complicated.

The processes for making many existing thermoplastic bags involve expensive and complicated steps. These steps typically include forming the seals and later forming the perforations. One problem that may arise in forming the thermoplastic bags is the improper alignment of the perforations and seals. This problem is exacerbated by the increased cycle times that are being more often used in the manufacturing of thermoplastic bags. An extreme case is where the perforation wanders outside the two side seals resulting in one of the two adjacent bags not having a side seal. One method for reducing or eliminating this problem is the formation of a wider "skirt" or target area between the seals. This, however, is costly to the manufacturer because of the additional polymeric resin being used in forming the "skirt" along the sides that provides no benefit to the customer.

For the foregoing reasons, there exists a need for a process that overcomes such shortcomings discussed above.

SUMMARY OF THE INVENTION

According to one process, two thermoplastic layers are simultaneously sealed and a thermal perforation created between two thermoplastic layers. Two thermoplastic layers and a drum having at least one sealbar and perforation assembly are provided. The two thermoplastic layers are contacted to the sealbar and perforation assembly. The thermoplastic layers are sealed with two generally opposing parallel seals, while simultaneously creating a thermal perforation in the thermoplastic layers generally parallel to the opposing seals. The thermal perforation are located between the two opposing seals.

According to another process, a sealbar and perforating assembly is heated on a drum to form opposing seals and a thermal perforation between two thermoplastic layers. The sealbar and perforation assembly comprises a first sealing surface, a second sealing surface and a perforation surface. At least one heat source is provided to supply heat to the first and second sealing surfaces and a perforation surface. The material forming the first and second sealing surfaces has a lower coefficient of thermal conductivity than the material forming the perforation surface. The first and second sealing surfaces and the perforation surface use the at least one heat source. Heat is removed from the first and second sealing surfaces and the perforating surface. The first and second sealing surfaces are at a lower temperature than the temperature of the perforation surface.

According to one embodiment, a rotary drum simultaneously seals and creates a thermal perforation between two thermoplastic layers. The drum comprises at least one sealbar and perforation assembly. The assembly has a body, a perforation insert and at least one heating source. The body has a cavity therein and opposing first and second sealing surfaces. The perforation insert is located in the cavity and has a perforating surface. The at least one heating source is adapted to supply heat to the first and second sealing surfaces and the perforating surface.

BRIEF DESCRIPTION OF THE DRAWINGS

Other objects and advantages of the invention will become apparent upon reading the following description of illustrative embodiments and upon reference to these drawings:

FIG. 1 is a schematic view of a rotary bag machine according to one embodiment of the present invention;

FIG. 2 is a top view of an interconnected web of bags with thermal seals and perforations according to one embodiment of the present invention;

FIG. 5 is a side view of a drum and a drum plate according to one embodiment of the present invention; and FIG. 6 is a top view of the drum and drum plate of FIG. 5.

Figure 3:
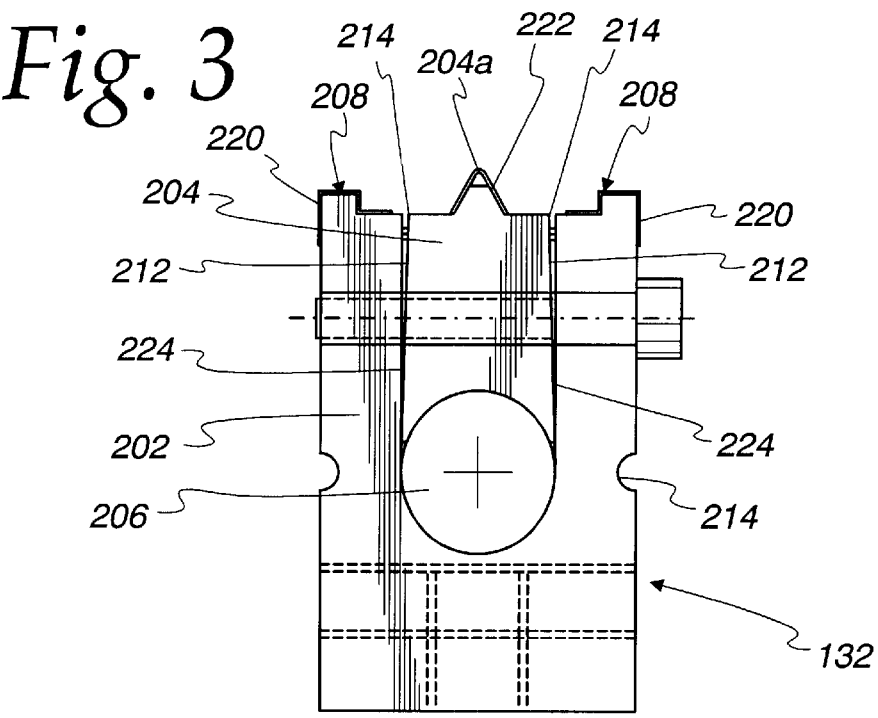
FIG. 3 is a sectional view of a sealbar/perforation assembly of one embodiment of the present invention.

While the invention is susceptible to various modifications and alternative forms, specific embodiments thereof have been shown by way of example in the drawings and will herein be described in detail. It should be understood, however, that the drawings are not intended to limit the invention to the particular forms disclosed, but on the contrary, the invention is to cover all modifications, equivalents and alternatives that fall within the spirit and scope of the invention

DESCRIPTION OF EMBODIMENTS OF THE INVENTION

The present invention relates to a process for simultaneously sealing two or more layers of thermoplastic film or, alternatively, a c-folded thermoplastic web, while creating a thermal perforation or a line of weakness that is generally parallel to the seals. This eliminates the need to mechanically perforate the film layers or c-folded web between the two seals in a later processing step. The two thermoplastic film layers or the c-folded thermoplastic web are used in the formation of interconnected thermoplastic bags. One type of bag that may be formed by the layers or the web is a trash bag.

According to one process, the thermoplastic film layers or the c-folded thermoplastic web are formed on a rotary bag machine. A rotary bag machine is desirable because of its continuous nature resulting in increased cycle rate for forming the bags.

Referring to FIG. 1, a rotary bag process for making an interconnected web of thermoplastic bags is shown using a bag manufacturing apparatus 100. The process of FIG. 1 uses a c-folded thermoplastic web 102 that is feed from a roll of c-folded thermoplastic web (not shown). Alternatively, the c-folded thermoplastic web 102 may be feed directly into the process shown in FIG. 1 from a downstream operation. The c-folded thermoplastic web may be formed from a blown film process in which a thermoplastic tube is severed and flattened. Instead of a c-folded thermoplastic web, two thermoplastic layers may alternatively be used. The c-folded thermoplastic web 102, however, is preferred. The thermoplastic material used in forming the c-folded thermoplastic web may be any suitable thermoplastic material. The thermoplastic materials may be formed by polyolefins such as polyethylenes, polypropylenes or combinations thereof One example is a high molecular weight, low density polyethylene (HMW/LDPE) film. The c-folded thermoplastic web 102 comprises a first layer 104 and a second layer 106 that are integrally folded along a bottom with an opposing open top.

The bag manufacturing apparatus 100 of FIG. 1 comprises a flexible backup surface or "blanket" 110, a plurality of rollers 112, 114, 116, 118, 120 and 122, a generally cylindrical sealbar/perforation drum 130 with a plurality of sealbar/perforation assemblies 132, 134, 136 and 138. According to one embodiment, the bag manufacturing apparatus 100 performs simultaneous thermal sealing and thermal perforating of the layers of the c-folded thermoplastic web via a common heat source using two materials with different coefficients of thermal conductivity to transport heat at different rates to the sealing and perforating surfaces.

As shown in FIG. 1, the thermoplastic web 102 is transported between the rollers 112 and 114 and contacts the blanket 110. The thermoplastic web 102 travels between the blanket 110 and the sealbar/perforation drum 130. The thermoplastic web 102, blanket 110 and drum 130 are maintained in relative close contact with a certain amount of pressure resulting in the drum 130 having a similar or the same speed as the blanket 110. The thermoplastic web 102a exits between the rollers 116 and 118. The rollers 112, 114, 116, 118, 120 and 122 assist in maintaining tension to transport the thermoplastic web 102 around the drum 130. Roller 116 may optionally provide cooling to the thermoplastic web 102a after exiting from contact with the drum 130.

The rollers 112, 114, 116, 118, 120 and 122 are mounted on a frame (not shown). The roller 120 may be driven by a motor 125 that consequently rotates the blanket 110. The rotation of the blanket 110 spins the drum 130. The blanket 110 provides a flexible surface to assist in sealing and perforating the thermoplastic web 102.

Referring still to FIG. 1, the drum 130 includes sealbar/ perforation assemblies 132, 134, 136 and 138. Each of the assemblies 132, 134, 136 and 138 forms seals extending across the c-folded thermoplastic web 102. Each of the assemblies 132, 134, 136 and 138 also makes two seals with a perforation therebetween. One example of the formed seals and the perforation is shown in FIG. 2. Specifically, FIG. 2 depicts a top view of a thermoplastic web 102a with seals 105 and a perforation or line of weakness 107 therebetween formed after exiting the drum 130. The assemblies 132, 134, 136 and 138 enable four bag structures of the web 102 to be sealed during each rotation of the drum 130. It is contemplated that one or more of the assemblies 132, 134, 136 and 138 may be deenergized so that less than four interconnected bag structures are formed per drum rotation. Thus, a variety of bag lengths may be manufactured by the deenergization of one or more assemblies. It is contemplated that the drum may have more or less than the sealbar/perforation assemblies shown in FIG. 1.

A cross section of the sealbar/perforation assembly 132 is shown in FIG. 3 according to one embodiment of the present invention. The seal bar/perforation assembly 132 that will be discussed below is applicable to the other assemblies 134, 136 and 138. The assembly 132 comprises a body 202, a perforation insert 204 and a heater cartridge 206. The diameter of the heater cartridge 206 extends through the center of the assembly 132. The perforation insert 204 is located in a cavity of the body 202. The perforation insert 204 of FIG. 3 is preferably tapered slighted from the heater cartridge 206 toward the perforating surface 204a to assist in maintaining desirable contact with the heater cartridge 206. It is contemplated that the perforation insert 204 may not be tapered. The sealbar/perforation assembly 132 may include opposing milled half-rounds 214 to assist in bending the sealbar inward so as to hold the insert 204 against the heater cartridge 206.

In FIG. 3, a slight air gap 212 is present between the perforating insert 204 and the body 202 that is maintained by assistance by opposing tabs 214. The slight air gap 212 assists in preventing or inhibiting transfer of heat between the body 202 and the perforating insert 204. It is contemplated that the air gaps may not be present and a conductivity coating is present between the body 202 and the perforating insert 204.

This heater cartridge 206 of FIG. 3 provides heat to both the perforating surface 204a and elevated sealing surfaces 208. It is contemplated that two or more heater cartridges or other heating devices may be used to separately provide heat to the perforating surface 204a and the sealing surfaces 208.

The body 202 has two elevated surfaces 208 at the top thereof that form two generally parallel seals along the width or length of the web 102. The elevated sealing surfaces 208 of the assembly 132 are preferably made of stainless steel. It is contemplated that the elevated sealing surfaces 208 may be made of other materials including steel alloys and stainless steel alloys. Such materials would preferably withstand the temperature involved in sealing and transporting the heat to the sealing surfaces 208. It is preferred that the elevated sealing surfaces 208 are made of a suitable material having a lower coefficient of thermal conductivity value than the material of the perforation surface 204a. The remainder of the body 202 is also preferably made of the same material as the elevated surfaces 208, such as stainless steel.

The seals may be formed, for example, in the locations depicted in FIG. 2 where the web 102 is traveling in the direction of the arrow. It is contemplated that the seals may be made in other locations than on the sides. For example, the thermoplastic film may have a seal and an associated perforation that correspond to a bottom of one thermoplastic bag and a top of an adjacent thermoplastic bag.

Figure 4A:
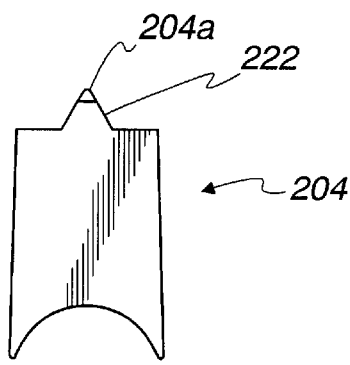
FIGS. 4a and b are end and side views of a perforation insert of the present invention.
Figure 4B:
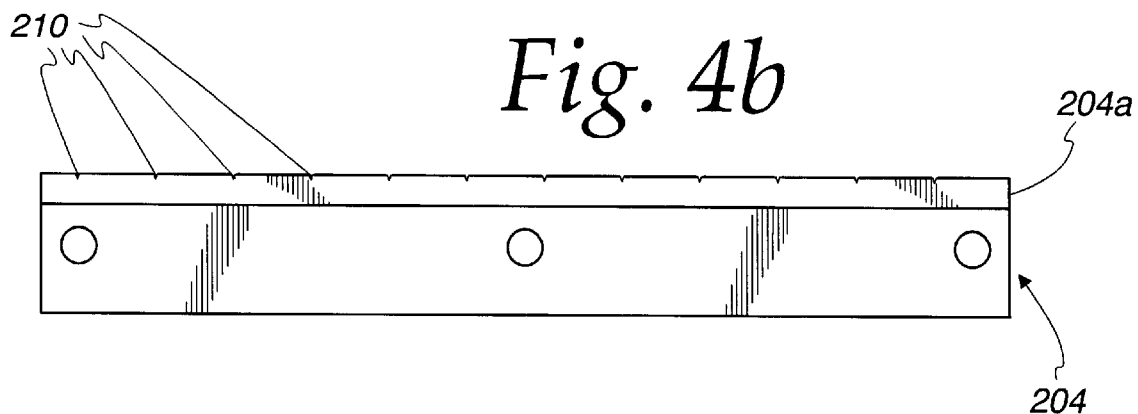

An end and a side view of the perforation insert 204 is shown in FIGS. 4a and b. The perforation insert 204 is slotted at regular spaced intervals 210 (see FIG. 4b) so that the perforation insert 204 does not cut entirely through the web 102. Thus, a thermal perforation or a line of weakness (see, e.g., the line of weakness 107 in FIG. 2) is formed with regular spaced intervals where the web 102 is not perforated. The perforation surface 204a may be made of aluminum, nickel, copper or combinations thereof It is contemplated that the perforation surface 204a may be made of other materials including steel alloys. Such materials would preferably withstand the temperature involved in perforating and transporting the heat to the perforating surface 204a. It is preferred that the perforation surface 204a has a higher coefficient of thermal conductivity value than the material of the body 202.

As the assembly 132 is heated, the two sealing surfaces 208 disposed at the generally outer periphery of the assembly 132 heat to a sufficient temperature to melt the thermoplastic web 102. Due to the higher coefficient of thermal conductivity of the material of the perforation insert 204 as compared to the material of the body 202, the surface of the perforating insert 204a heats more quickly than the sealing surfaces 208.

According to one process, the assembly 132 begins to contact the thermoplastic web 102. At this point, heat is removed from both the sealing surfaces 208 and the perforating surface 204a. The perforating insert 204 is preferably designed to replenish the lost heat more quickly than the body 202 replenishes the heat to the sealing surfaces 208. This preferably results in a generally dynamic equilibrium wherein the temperature of the perforating surface 204a stabilizes at a significantly higher temperature than the sealing surfaces 208. This temperature difference allows the sealing surfaces 208 to be at an appropriate temperature for sealing, while the perforating surface 204a is at an appropriate temperature for perforating. Further, this temperature difference is generally enhanced because the sealing surfaces 208 have a larger surface area than the perforating surface 204a. The perforating surface 204a creates a line of weakness in a direction generally parallel to the direction of sealing by melting a portion of the web while leaving a portion of the web (at the points of the intervals 210) intact.

The perforating surface 204a and sealing surfaces 208 may include optional coatings. For example, a coating may be placed on the perforating surface 204a to provide high release characteristics and achieve high thermal conductivity (relative to the optional coating on surfaces 208). The higher thermal conductivity coating has a thickness generally from about 0.001 to about 0.002 inches (1 to 2 mils). The high release characteristics and high thermal conductivity are achieved by material properties and thickness of the coating. An example of a higher thermal conductivity coating is a multiple layered coating including (a) a binder or primer, (b) a Teflon layer and (c) one or more layers of perflouroalkoxy.

The sealing surfaces 208 may be coated with a lower thermal conductivity coating that assists in reducing heat transfer from the assembly 132. The lower thermal conductivity coating preferably provides good release characteristics. The lower thermal conductivity coating is generally from about 0.005 to about 0.010 inches and, more specifically, from about 0.005 to about 0.008 inches. An example of a coating to be used on surface 204a is a polytetraflouroethylene coating.

Referring back to FIG. 3, a lower thermal conductivity coating 220 has been added to sealing surfaces 208 and a higher thermal conductivity coating 222 has been added to the perforating surface 204a. It is also contemplated that a lower thermal conductivity coating may be added between the body 202 and the perforating insert 204.

The drum of the present invention may be designed to vary in diameter so as to allow for the making of different sized interconnected bag structures. According to one embodiment depicted in FIGS. 5 and 6, the drum 130 is shown including a plurality of sealbar/perforation assemblies 232, 234, 236 and 238 and a plurality of elongated slats 240. The plurality of elongated slats 240 are located between the assemblies 232, 234, 236 and 238 as shown in FIG. 5.

For clarity, the plurality of elongated slats 240 is not shown in FIG. 6. The drum 130 includes drum plates 242 located on opposing sides thereof. The drum 130 also includes a drum adjust motor 244.

Each of the plurality of elongated slats 240 has a slightly curved exterior surface. The plurality of elongated slats 240 assists in supporting the thermoplastic web 102 between the assemblies 132, 134, 136 and 138. Additionally, the plurality of elongated slats 240 assist in trapping a portion of the thermoplastic web 102 such that there is a little slack therein while sealing and creating the perforations. The plurality of elongated slats 240 may be made from steel and may include a rubber padding surface.

To adjust the diameter of the drum 130, the drum 130 includes a plurality of radially extending lead screws 246 that are adjustable via a main gear 248. As shown in FIG. 5, all of the assemblies 232, 234, 236 and 238 and elongated slats 240 ride on one of the plurality of radially extending lead screws 246. The sealbar/perforation assemblies 232, 234, 236 and 238 (as well as the elongated slats 240) are held in place by respective holders 232a, 234a, 236a and 238a that also assist in moving the assemblies when the diameter is desired to be adjusted.

In conjunction with the drum 130, the rollers 112 and 114 may be mounted on a swinging arm (not shown) that allows the blanket 110 to wrap more of the drum 130. Depending on the drum diameter, the rollers 112 and 114 may automatically eliminate slack by wrapping more or less of the drum 130.

After the web of interconnected bags has been heat sealed, perforated, and cooled, they are typically separated, folded individually and packaged. Alternatively, the web of interconnected bags may be wound into rolls for packaging.

The simultaneous sealing/perforating steps of the present invention simplify the manufacturing and production process, and increase production efficiency. These processes also reduce downtime needed for maintenance and change-out of worn parts in the steps. Furthermore, the costs of maintaining a high quality manufacturing process are reduced as the number of product defects with an improperly located perforation are reduced. Furthermore, the skirt size may be reduced since the target area is not necessary to maintain registration of the perforation and seal. The reduction of the skirt area reduces the polymeric material used in forming a bag.

While the invention has been described with respect to a number of limited embodiments, variations and modifications exist. Those skilled in the art will recognize that many changes may be made thereto without departing from the spirit and scope of the present invention. The appended claims intend to cover all such variations and modifications as falling in within the scope of the invention, which is set forth in the following claims:

What is claimed is:

1. A method for simultaneously sealing and creating a thermal perforation between two thermoplastic layers, the method comprising:

providing two thermoplastic layers;

providing a drum having at least one sealbar and perforation assembly;

providing a flexible backup surface and transporting the two thermoplastic layers between the drum and the flexible backup surface;

contacting the two thermoplastic layers to the at least one sealbar and perforation assembly; and sealing the thermoplastic layers with two generally opposing parallel seals and simultaneously creating a thermal perforation in the thermoplastic layers generally parallel to the opposing seals, the thermal perforation being located between the two opposing seals.

2. The method of claim 1, wherein the two thermoplastic layers are integrally connected so as to form a c-folded thermoplastic web.

3. The method of claim 2, wherein the c-folded thermoplastic web is a web of interconnected bags.

4. The method of claim 3, wherein the web of interconnected bags forms trash bags.

5. The method of claim 1, wherein one of the two thermoplastic layers comprises a polyolefin and the other of the two thermoplastic layers comprises an independently selected polyolefin.

6. The method of claim 1, wherein the at least one sealbar and perforation assembly includes a first sealing surface, a second sealing surface and a perforating surface.

7. The method of claim 6, wherein the at least one sealbar and perforation assembly further includes at least one heating source adapted to supply heat to the first sealing surface, the second selling surface and the perforating surface.

8. The method of claim 7, wherein the material of the perforating surface has a coefficient of thermal conductivity that is greater than a coefficient of thermal conductivity of the materials forming the first sealing surface and the second sealing surface.

9. The method of claim 6, wherein the perforating surface comprises aluminum, nickel, copper or combinations thereof.

10. The method of claim 6, wherein the first and second sealing surfaces comprise stainless steel or stainless steel alloys.

11. The method of claim 6, wherein the perforating surface has a coating thereon.

12. The method of claim 11, wherein each of the opposing sealing surfaces has a coating thereon.

13. The method of claim 1, wherein the drum has at least four sealbar and perforation assemblies.

14. A method of heating a sealbar and perforating assembly on a drum to form opposing seals and a thermal perforation between two thermoplastic layers, the method comprising:

providing the sealbar and perforation assembly, the assembly comprising a first sealing surface, a second sealing surface and a perforation surface;

providing at least one heat source to supply heat to the first and second sealing surfaces and a perforation surface, the material forming the first and second sealing surfaces having a lower coefficient of thermal conductivity than the material forming the perforation surface;

heating the first and second sealing surfaces and the perforation surface using the at least one heat source; and removing heat from the first and second sealing surfaces and the perforating surface, the first and second sealing surfaces are at a lower temperature than the temperature of the perforation surface.

15. The method of claim 14, wherein at least two heat sources are provided, the first heat source supplies heat to the first and second sealing surfaces and the second heat source supplies heat to the perforating surface.

16. The method of claim 14, wherein exactly one heat source is provided, the heat source supplies heat to the first and second sealing surfaces and the perforation surface.

17. The method of claim 14, wherein the provided sealbar and perforation assembly is adapted to form two opposing parallel seals and simultaneously create a thermal perforation in the two thermoplastic layers generally parallel to the opposing seals, the thermal perforation is located between the two opposing seals.

18. The method of claim 14, wherein the perforating surface comprises aluminum, nickel, copper or combinations thereof.

19. The method of claim 14, wherein the first and second sealing surfaces comprise stainless steel or stainless steel alloys.

20. The method of claim 14, wherein the perforating surface has a coating thereon.

21. The method of claim 20, wherein each of the opposing sealing surfaces has a coating thereon.

* * * * *